US008676376B2

(12) United States Patent
Quartarone et al.

(10) Patent No.: US 8,676,376 B2
(45) Date of Patent: Mar. 18, 2014

(54) SYSTEMS AND METHODS FOR DISPENSING CONTROL FOR A PRODUCT DISPENSER

(75) Inventors: Daniel S. Quartarone, Stone Mountain, GA (US); Erika Gomez, Atlanta, GA (US)

(73) Assignee: The Coca-Cola Company, Atlanta, GA (US)

( * ) Notice: Subject to any disclaimer, the term of this patent is extended or adjusted under 35 U.S.C. 154(b) by 128 days.

(21) Appl. No.: 13/168,558

(22) Filed: Jun. 24, 2011

(65) Prior Publication Data

US 2012/0325844 A1 Dec. 27, 2012

(51) Int. Cl.

| | |
|---|---|
| ***G06F 17/00*** | (2006.01) |
| ***B67D 7/74*** | (2010.01) |
| ***B67D 1/00*** | (2006.01) |
| ***B67D 7/06*** | (2010.01) |

(52) U.S. Cl.
USPC ........... 700/231; 700/236; 700/240; 700/239; 222/129.1; 222/52; 222/25; 222/144.5

(58) Field of Classification Search
None
See application file for complete search history.

(56) References Cited

U.S. PATENT DOCUMENTS

| | | | | |
|---|---|---|---|---|
| 2007/0114244 | A1* | 5/2007 | Gatipon et al. ............ | 222/129.1 |
| 2010/0318221 | A1* | 12/2010 | Wiemer et al. ................ | 700/240 |

FOREIGN PATENT DOCUMENTS

| | | | |
|---|---|---|---|
| WO | 2007056407 | A2 | 5/2007 |
| WO | 2009032941 | A2 | 3/2009 |
| WO | 2009032946 | A1 | 3/2009 |

OTHER PUBLICATIONS

Search Report and Written Opinion for International Application No. PCT/US2012/043738 mailed Sep. 3, 2012.

Response to Written Opinion for International Application No. PCT/US2012/043738 filed Apr. 23, 2013.

* cited by examiner

*Primary Examiner* — Yolanda Cumbess

(74) *Attorney, Agent, or Firm* — Sutherland Asbill & Brennan LLP

(57) ABSTRACT

Embodiments of the invention include systems and methods of dispensing control for a product dispenser. In one embodiment, a system or product dispenser can be provided. The system or product dispenser can include a plurality of beverage ingredient sources comprising a respective beverage ingredient, a plurality of beverage supply lines in respective communication with the plurality of ingredient sources, at least one pump in communication with the plurality of beverage supply lines, and a controller in communication with the at least one pump and operable to execute a set of instructions. The set of instructions can be operable to store data associated with a prior poured beverage, provide a command for a user to dispense the prior poured beverage in a subsequent pour, and after selection of the command, based at least in part on the data associated with a prior poured beverage, dispense a subsequent beverage similar to the prior poured beverage.

20 Claims, 4 Drawing Sheets

SYSTEMS AND METHODS FOR DISPENSING CONTROL FOR A PRODUCT DISPENSER

TRADEMARKS

COCA-COLA® is a registered trademark of The Coca-Cola Company, Atlanta, Ga., U.S.A. Other names, symbols, designs, or logos used herein may be registered trademarks, trademarks or product names of The Coca-Cola Company or other companies.

TECHNICAL FIELD OF THE INVENTION

This invention relates to product dispensers, and in particular, relates to systems and methods of dispensing control for a product dispenser.

BACKGROUND OF THE INVENTION

Conventional product dispensers can pour a beverage by combining a syrup, sweetener, and/or water. To create a finite variety of beverage selections different kinds of syrup can be offered. This typically results in being able to offer a finite number of branded and non-branded beverage selections. As an example, a single prior art dispenser using several different kinds of syrup might be able to offer limited choices of COCA-COLA™, DIET COCA-COLA™, SPRITE™, and a few other branded or non-branded beverage selections.

One problem with these types of conventional product dispensers is that only a limited number of drinks can be offered. As such, conventional product dispensers may be limited in being able to offer the consumer what they want. In this regard, consumers want a wider menu of beverage selections and the ability to customize their beverage. Research suggests that they want more beverage variations even for a traditional branded beverage. For example, offering COCA-COLA™, COCA-COLA™ with lime, CHERRY COCA-COLA™, VANILLA COCA-COLA™ and numerous other types of COCA-COLA™ beverage variations. Offering all the variations possible for a single drink brand such as COCA-COLA™ are impractical in conventional product dispensers in part because conventional product dispensers have limited capacity and selection capability. They may not offer the consumer what the consumer wants, that is, a complete variety of choices for all types of branded and non-branded beverages.

Product dispensers historically have worked by combining a diluent (such as water) with a beverage base. These beverage bases usually have a reconstitution ratio of about 3:1 to 6:1. The beverage bases usually come in large containers that require large amounts of storage space and may need to be refrigerated. These requirements often necessitate the need to store these containers far from the actual dispenser and to run long lines from the containers to the dispenser.

Given the improvements in shelf life and concentration described above, there is a desire for a product dispenser that can produce even more and different types of beverages while using a smaller footprint. This can be accomplished by breaking down the traditional beverage bases into constituent parts at much higher reconstitution ratios. These parts can then be stored in much smaller packages and stored closer to, adjacent to, or within the product dispenser itself. The product dispenser preferably can give the consumer multiple beverage options such that the consumer has the ability to customize his or her beverage as desired.

In certain instances, some beverages may have different carbonation or foaming characteristics when poured or otherwise dispensed. This occurrence may be due to the differences in the ingredients used to formulate each beverage. In any instance, non-carbonated beverages will "top off" consistently when poured or otherwise dispensed in a container, such as a cup. When certain carbonated beverages are poured or dispensed, depending on the amount of carbonation, each beverage may have one or more additional amounts added during subsequent pours or dispenses to "top off" the beverage in a container or cup. In conventional product dispensers, the operation to "top off" different beverages can be a time consuming, manually initiated operation that requires the operator to individually "top off" each poured or dispensed beverage. When an inexperienced user or operator frequently pours or dispenses different beverages, various amounts of the beverage may be wasted in learning how to "top off" each different beverage. Even experienced users or operators may waste beverages when changing between different poured or dispensed beverages.

SUMMARY OF THE INVENTION

Some or all of the above needs and/or problems may be addressed by embodiments of the invention. Embodiments of the invention can include systems and methods of dispensing control for a product dispenser. In one embodiment, a system or product dispenser can be provided. The system or product dispenser can include a plurality of beverage ingredient sources comprising a respective beverage ingredient, a plurality of beverage supply lines in respective communication with the plurality of ingredient sources, at least one pump in communication with the plurality of beverage supply lines, and a controller in communication with the at least one pump and operable to execute a set of instructions. The set of instructions can be operable to store data associated with a prior poured beverage, provide a command for a user to dispense the prior poured beverage in a subsequent pour, and after selection of the command, based at least in part on the data associated with a prior poured beverage, dispense a subsequent beverage similar to the prior poured beverage.

Another embodiment can provide a computer program product. The computer program product can include a computer readable medium having computer readable program code, the computer readable program code operable to be executed to implement a method for operating a product dispenser. The method can include storing data associated with a prior poured beverage, providing a command for a user to dispense the prior poured beverage in a subsequent pour, and after selection of the command, based at least in part on the data associated with a prior poured beverage, dispensing a subsequent beverage similar to the prior poured beverage.

Another embodiment can provide a method of operating a product dispenser. The method can include storing data associated with a prior poured beverage, providing a command for a user to dispense the prior poured beverage in a subsequent pour, and after selection of the command, based at least in part on the data associated with a prior poured beverage, dispensing a subsequent beverage similar to the prior poured beverage.

In yet another embodiment, a method for operating a product dispenser can be provided. The method can include dispensing a first product, storing information associated with dispensing the first product, and initiating a command to dispense a second product, wherein the second product is similar to the first product.

Additional systems, methods, product dispensers, apparatus, aspects, and features are realized through the techniques of various embodiments of the invention. Other embodiments, aspects, and features of the invention are described in detail herein and are considered a part of the claimed invention. Other embodiments, aspects, and features can be understood with reference to the description and to the drawings.

The detailed description explains various embodiments of the invention, together with aspects and features, by way of example with reference to the drawings.

DETAILED DESCRIPTION OF EMBODIMENTS OF THE INVENTION

As used herein, the terms "beverage forming dispenser," "product dispenser," "beverage dispenser," "dispenser apparatus," and "dispenser" refer to a device which dispenses a product such as a beverage, a fluid, or a consumable product.

As used herein, the terms "product" and "beverage," and their pluralized forms, are used synonymously, and embodiments of the invention should not be limited in scope by the use of either term.

As used herein, the terms "top off" and "topping off" refer to an operation used to add more product, beverage, fluid, other substances or materials, or any combination thereof into a container to fill the container to a desired level or volume.

Embodiments of the invention can include systems and methods of dispensing control for a product dispenser. Other embodiments of the invention can include systems and methods for operating a product dispenser. Certain embodiments of the invention can be particularly useful when operating a product dispenser, such as a beverage dispenser. In one instance, when a user or operator is using a product or beverage dispenser to fill a container, such as a cup, the product or beverage dispenser can automatically pour or dispense a prior or last poured product or beverage. In this manner, a user or operator can minimize the time spent in topping off a subsequent product or beverage being poured or dispensed with a product or beverage dispenser. Thus, certain embodiments of the invention can provide a technical solution to the time consuming problem of topping off a product or beverage using a product dispenser, such as a beverage dispenser.

The circumstances provided above are for illustration only, and are not intended to be limiting. One will recognize other circumstances for applying embodiments of the invention, and the applicability of those embodiments to other product and/or beverage dispenser technologies.

Figure 1:
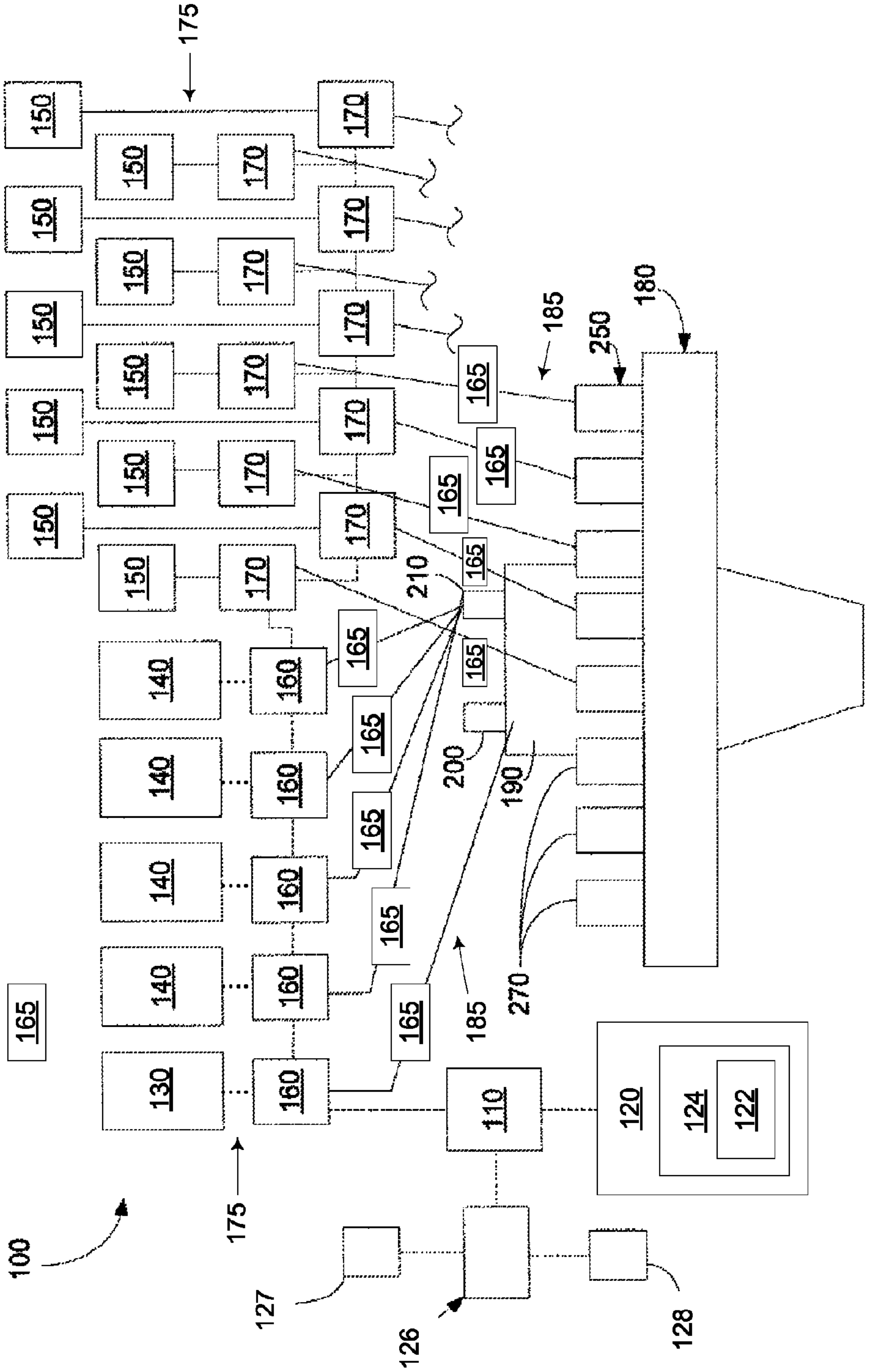
FIG. 1 is a schematic view of an example product dispenser in accordance with an embodiment of the invention.

Turning now to the drawings in greater detail, in which like numerals indicate like elements throughout the several views, FIG. 1 shows an example system such as a product dispenser 100 as is described herein. A user interface 110 may control some or all of the functional aspects of the product dispenser 100. A consumer may select and/or create numerous types of beverages, blends, and additives using the user interface 110. Furthermore, a food service employee and/or dispenser technician may use the user interface 110 to implement certain installation and/or maintenance functions. A control device 120 may support the user interface 110. The control device 120 may be a conventional microcomputer, processor, or a similar type of device. The control device 120 may be internal to or remote from the product dispenser 100.

The product dispenser 100 may use any number of different ingredients. In this example, several different types of ingredients may be used: water (plain and/or carbonated) from a water source 130; macro-ingredients from a number of macro-ingredient sources 140; and micro-ingredients from a number of micro-ingredient sources 150. Any number or combinations of sources 130, 140, 150 may be used herein. For example, it may not be necessary to have a macro-ingredient source, e.g., HFCS (High Fructose Corn Syrup), which is difficult to pump at high reconstitution ratios, may not be used. As such, only a diluent and a micro-ingredient source may be required. In another example, 106 unique ingredient sources 140, 150 may be present in a product dispenser, such as 100, in accordance with an embodiment of the invention. One will recognize that other embodiments of the invention can include fewer or greater numbers of ingredient sources 140, 150.

The water from the water source 130 may or may not be refrigerated. Other types of diluents may be used herein. A conventional carbonator or a similar type of device may be used to produce carbonated water as desired. The amount of carbonation may be varied.

Generally described, the macro-ingredients may have reconstitution ratios in the range of about 3:1 to about 6:1. The viscosities of the macro-ingredients typically range from about 100 centipoise or higher. Macro-ingredients may include sugar syrup, HFCS, juice concentrates, and similar types of fluids. Similarly, a macro-ingredient base product may include sweetener, acid, and other common components. The syrups, sweeteners, and base products generally can be stored in a conventional bag-in-box container remote from the dispenser 100. The macro-ingredients also may be positioned within the product dispenser 100 itself. Any type of container may be used herein in accordance with embodiments of the invention. The macro-ingredients may or may not need to be refrigerated.

The micro-ingredients may have a reconstitution ratio ranging from about ten to one (10:1), twenty to one (20:1), thirty to one (30:1), or higher. Specifically, many micro-ingredients may be in the range of fifty to one (50:1) to three hundred to one (300:1). The viscosities of the micro-ingredients typically range from about 1 to about 100 centipoise or so. Examples of micro-ingredients include natural and artificial flavors; flavor additives; natural and artificial colors; artificial sweeteners (high potency or otherwise); additives for controlling tartness, e.g., citric acid, potassium citrate; functional additives such as vitamins, minerals, herbal extracts; nutraceuticals; and over-the-counter (or otherwise) medicines such as acetaminophen and similar types of materials. As described above, the acid and non-acid components of the non-sweetened concentrate also may be separated and stored individually. The micro-ingredients may be liquid, powder (solid), or gaseous form and/or combinations thereof. The micro-ingredients may or may not require refrigeration. Non-beverage substances such as paints, dyes, oils, cosmetics, etc., also may be used. Various types of alcohols may be used as micro or macro-ingredients.

In certain instances, the micro-ingredients and the micro-ingredient sources 150 may be positioned within or about the product dispenser 100 itself as opposed to being remotely positioned in conventional bag in box containers or otherwise. By being positioned about the dispenser, the micro-ingredient sources 150 can, for example, be positioned in close proximity to the dispenser 100 such as adjacent thereto, underneath, or in other near by positions. Any other type of storage arrangements may be used in accordance with embodiments of the invention. The macro and/or micro-ingredient sources may optionally be located remotely from the dispenser 100, such as in a back room, connected to the dispenser 100 with conventional tubing. Furthermore, any type of container may be used herein in accordance with embodiments of the invention.

The water source 130, the macro-ingredient sources 140, and the micro-ingredient sources 150 each may be in communication with a respective pump 160, sensor 165, and/or a metering device 170 via a respective supply line 175. The control device 120 may control the pumps 160, sensors 165, and metering devices 170. Generally described, the water source 130 and the macro-ingredient sources 140 each may be in communication with one of the pumps 160. The pump 160 may be a conventional solenoid pump or a similar type of device.

The micro-ingredient sources 150 each may be in communication with a respective metering device 170 via a respective supply line 175. The metering device 170 may be a positive displacement pump or a similar type of device. Such a positive displacement pump provides portion control for the more highly concentrated micro-ingredients. An example of the operation of a positive displacement pump is shown in commonly owned U.S. patent application Ser. No. 11/276,548, entitled “Pump System with Calibration Curve” incorporated herein by reference.

For example, the positive displacement pump may be a solenoid pump, a gear pump, an annular pump, a peristaltic pump, a syringe pump, a piezo pump or any other type of positive displacement device that is designed to pump a fixed displacement for each pump cycle.

The pumps 160, sensors 165, and the metering devices 170 may be in communication with a dispensing nozzle 180 via respective supply lines 185. The dispensing nozzle 180 preferably may be a multi-flavor dispensing valve capable of mixing a number of fluids at the same time. Examples of dispensing nozzles that may be used herein are shown in commonly owned U.S. patent application Ser. No. 10/233,867 (U.S. Patent Publication No. US 2004/0040983 A1), entitled “Dispensing Nozzle” and commonly-owned U.S. patent application Ser. No. 11/276,551, entitled “Dispensing Nozzle Assembly”. Collectively or individually, the supply lines 175, 185 can be known as beverage supply lines.

Figure 2:
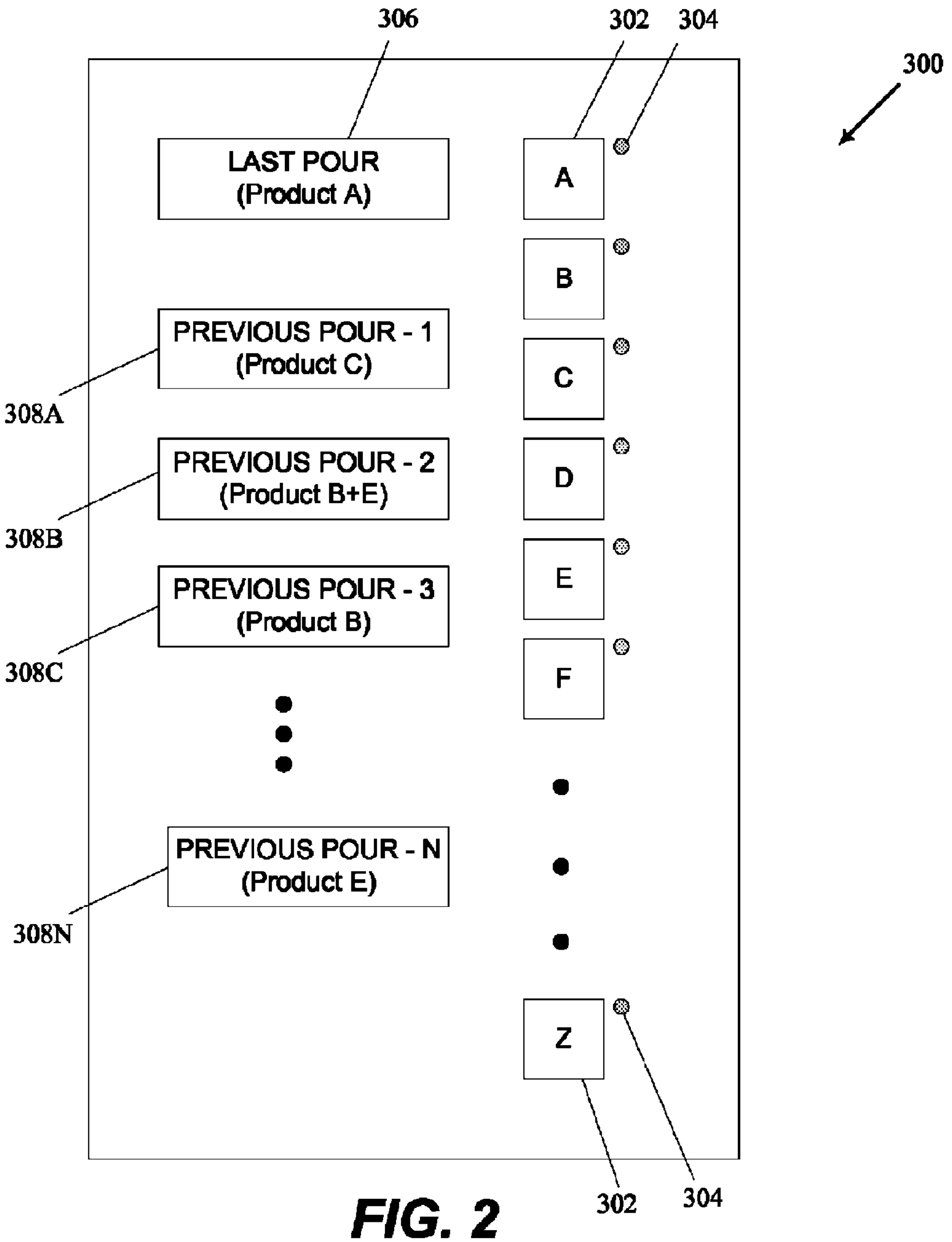
FIG. 2 is a schematic view of an example user interface for use with the product dispenser of FIG. 1, in accordance with an embodiment of the invention.

In the embodiment shown, a user interface, such as 300 in FIG. 2, may include one or more product or beverage selection options. Depending on the selected product or beverage selection option, the control device 120 in FIG. 1 may receive a corresponding signal from the interface 300 that the selected product or beverage is desired. After product selection, or after pouring or dispensing the selected product or beverage, the control device 120 can store information associated with the selected product or beverage. The control device 120 may store the information in memory, such as 124, or another data storage device. In certain instances, the control device 120 can store information associated with more than one prior selected or prior poured or dispensed products or beverages.

In one embodiment, the sensors 165 can be operable to detect an ingredient or component in the respective supply lines 175, 185, and can communicate one or more corresponding signals to the control device 120 when certain ingredients or components are detected. The sensors 165 in FIG. 1 are shown positioned with respect to a supply line, such as 175, 185, for each ingredient source 140, 150. One will recognize that the sensors 165 can be positioned in any location with respect to a supply line 175, 185 between at least one ingredient source 140, 150 and a dispensing nozzle, such as 180. In this particular embodiment, the control device 120 can receive the signal and store the information associated with the one or more signals. For example, upon receipt of an indication from a control device 120 that a certain ingredient or component exists in one or more particular supply lines, such as 175 or 185, the control device 120 can store information associated with any number of ingredients or components being provided by the one or more particular supply lines 175, 185. The control device 120 can check against a table, database, or other stored information, which may identify a particular product or beverage being provided, and the control device 120 can store this information in memory 124 or another data storage device.

In any instance, the control device 120 can interact with the interface 110 to provide an indication adjacent to an existing product button or a user selectable button or command to provide a user the option of selecting a last poured or dispensed product or beverage. Upon subsequent selection of the corresponding product button or user selectable button or command, one or more of the pumps 160 associated with certain supply lines 175, 185 can dispense a subsequent beverage similar to the prior poured beverage.

Generally shown in FIG. 1, the dispensing nozzle 180 can include a flow director 190 with a number of conduits extending therethrough. In this example, the flow director 190 may have a first conduit 200 and a second conduit 210 extending therethrough. The first conduit 200 may be used for water, other types of diluents, or other fluids. The second conduit 210 may be used for a macro-ingredient such as sweetened concentrate, sugar syrup, HFCS syrup, juice concentrate, or other type of fluids. Positioned beneath the flow director 190 may be a target, which may include a number of vertically extending fins that form a number of U- or V-shaped channels. The water, the macro-ingredients, or other fluids may flow out of the flow director 190 and down along the channels of the target so as to begin mixing.

Positioned adjacent to the flow director 190 may be a tertiary flow assembly 250. The tertiary flow assembly 250 may include a number of modules, which may have a number of conduits 270 extending therethrough. The conduits 270 may have differing sizes and configurations depending upon the nature of the intended flow therethrough. The modules may be replaceable and interchangeable. Each of the modules and the conduits 270 may be in communication with one of the micro-ingredient sources 150 or other types of fluids. The conduits 270 may be aimed towards the target so as to mix the micro-ingredients or other fluid with the water, the macro-ingredients, or other fluid. Any number of micro-ingredients or other types of fluids may be used at the same time.

As stated above, the control device 120 may be, for example, a processor or controller. The control device 120 may include one or more computer-executable instructions 122 stored in an associated memory, such as 124, or other computer-readable medium. The computer-executable instructions can include instructions operable to store data associated with a prior poured beverage, provide a command for a user to dispense the prior poured beverage in a subsequent pour, and after selection of the command, based at least in part on the data associated with a prior poured beverage, dispense a subsequent beverage similar to the prior poured beverage. In at least one embodiment, the computer-executable instructions can include instructions further operable to provide a multiple pour command for a user to dispense the prior poured beverage in a plurality of subsequent pours, and after selection of the multiple pour command, based at least in part on the data associated with a prior poured beverage, dispense a plurality of beverages similar to the prior poured beverage. In at least one other embodiment, the computer-executable instructions can include instructions further operable to display, via a user interface in communication with a controller, the command for selection by the user. In yet another embodiment, the computer-executable instructions can include instructions further operable to facilitate an interface in communication with the controller, the interface operable to receive user selection of the command.

The product dispenser 100 also may include a user data system 126 in communication with the user interface 110 and the control device 120. The user data system 126 may include a communications device 127. The communications device 127 may include a video touch screen, a video screen and keyboard, a gesture detection device, touchpad, or any other type of conventional input/output device. The communications device 127 may be part of the user interface 110 or a separate element.

In one embodiment, the communications device 127 may include a network interface, such as a network input/output interface in communication with the control device 120. The communications device 127 may access one or more remotely located data storage devices via a network to obtain or otherwise access a table, recipe database, or other stored information to identify a product or beverage. Such information can be communicated to the control device 120.

In certain embodiments, a communications device 127 may prompt the user to input data on various types of biometric and/or other types of information. Based upon the user's input, the control device 120 may analyze the data and may convert the user's input to one or more pouring or dispensing commands.

In addition to the communications device 127 as described above, the user data system 126 also may include one or more biometric sensors 128. The biometric sensors may include automated devices to gather the desired user biometric data or other information. The biometric sensors 128 may include a scale, a blood pressure cuff, a breathalyzer, a blood analyzer, a hair analyzer, an EKG, etc. Any type of monitoring device may be used herein. Any number of biometric sensors 128 may be used together. The biometric sensors 128 may be in communication with the control device 120 as described above.

FIG. 2 shows an embodiment of the user interface 110, as interface 300. As shown, the user interface can be a graphical interface, which may include one or more physical buttons and/or computer generated touch screen display buttons or icons. In any instance, the interface 300 may include one or more predefined product buttons 302. Each product button 302 may represent a different product or beverage selection. When desired, each product button 302 can be selected by a user to pour or dispense the selected product or beverage. Each product button 302 may have an indicator 304 that may signal to a user that a certain product or beverage is a prior or last poured product or beverage. In certain instances, one or more new product buttons or commands can be generated or otherwise displayed on the interface. For instance, a last poured button 306 may be displayed, or a series of previously poured buttons 308A, 308B, 308C . . . 308N indicating a predefined number of previously poured beverages in sequential order may be displayed. In any instance, a user can readily observe via the interface 300 which product or beverage is the last or a previously poured product or beverage.

In the embodiment shown, the last poured button 306 can be used to initiate a subsequent pour or dispense operation of the last poured or dispensed product or beverage. For example, the last poured button 306 can initiate a command which pours or dispenses the last poured or dispensed product or beverage. In certain instances, the last poured button 306 can indicate other information associated with the last poured or dispensed product or beverage, such as the product or beverage brand name. In other instances, combinations of products or beverages may have been the last poured or dispensed product or beverage, in which case, information indicating the combination can be displayed or otherwise output. In another embodiment, the last poured button 306 or another button, can initiate a command which pours or dispenses the last poured or dispensed product or beverage multiple times.

In the embodiment shown, the series of previously poured buttons 308A-308N can be used to initiate a pour or dispense operation of more of the previously poured or dispensed products or beverages. For example, the series of previously poured buttons 308A-308N may display in a sequential order the previous 10 poured or dispensed products or beverages. Generally, when the interface 300 is used, a user or product dispenser operator can select from one or more of the series of previously poured or dispensed products or beverages, which can initiate pouring or dispensing subsequent products or beverages similar to the selected previously poured or dispensed products or beverages. In certain instances, one or more of the series of previously poured buttons 308A-308N can indicate other information associated with the previously poured or dispensed product or beverage, such as the product or beverage brand name and/or the amount or volume poured or dispensed. In other instances, combinations of products or beverages may have been the previously poured or dispensed product or beverage, in which case, information indicating the combination can be displayed or otherwise output. In other embodiments, buttons or commands for any number of previously poured or dispensed products or beverages can be displayed. In another embodiment, each of the series of previously poured buttons 308A-308N or another button, can initiate a command which pours or dispenses a selected previously poured or dispensed product or beverage multiple times.

In one embodiment, a user can select from any number of particular "branded" beverages. For example, icons associated with the "Cherry Coke®" beverage and the "Coca-Cola®" beverage sold by The Coca-Cola Company of Atlanta, Ga. can be displayed on a user interface, such as 300 in FIG. 2. The product dispenser 100 thus may provide via the user interface 300 as many "branded" beverages as may be available from the product dispenser 100. In certain instances, the "branded" beverages and/or icons may be displayed on the last poured buttons 306 and/or the series of previously poured buttons 308A-308N.

In certain embodiments, the interface 300 operating alone or in conjunction with a communications device, such as 127, and/or a biometrics sensor, such as 128, may provide a user, such as an individual product dispenser operator, with secure access by password, smart card, biometric identification, credit card, RFID, or otherwise. In other embodiments, user or operator preferences also may be retained and used for future product dispenser maintenance.

In addition to the graphical interface, a product dispenser 100 as a whole may provide other product dispenser statistics and troubleshooting information. For example, the delay time for the start of the pumps 160 or the metering devices 170, the times for the vent and/or flush cycles, the portion cycles, etc. may be accessed through the user interface 110, 300. This interface 110, 300 may be password or otherwise protected.

The user interface 110, 300 may communicate and/or be accessed as needed with a network or other source for troubleshooting or repair and for notifications or alerts, for example, of a potential incorrect dose of ingredients.

In use, a user such as a product dispenser operator, for example a food service employee and/or dispenser technician, may select a last poured or previously poured beverage from the user interface 110 to dispense as the desired next poured beverage. After user selection of an initial desired beverage via the user interface 110, the control device 120 can initiate pouring of the desired beverage. The control device 120 can store information associated with the last poured beverage in memory 124 or other data source. Based at least in part on the stored information, the control device 120 can provide a user selectable button or command on the user interface 110 to select the last poured or previously poured beverage. When the user selectable button or command is implemented by a user, the control device 120 can receive the command or corresponding signal from the user interface 110 and communicate with or control one or more of the sources 130, macro-ingredient sources 140, 150, supply lines 175, 185, and pumps 160 to facilitate pouring a subsequent beverage similar to the last poured or previously poured beverage.

For example, a user may select a desired beverage Product A via the user interface 110, wherein the control device 120 can initiate pouring of the desired beverage in a container, such as a cup. The control device 120 can store information associated with the last poured beverage in memory 124 or other data storage device. The stored information may include a predefined volume and recipe of the last poured beverage including any recipe adjustments and user-entered data associated with adjusting the recipe. Based at least in part on the stored information, the control device 120 can provide a user selectable button or command, such as a last pour button 306, on the user interface 110 for the user to select the last poured beverage. When the last pour button 306 is selected by a user, the control device 120 can receive the command or corresponding signal from the user interface 110 and communicate with or control one or more of the sources 130, macro-ingredient sources 140, 150, supply lines 175, 185, and pumps 160 to facilitate pouring a subsequent beverage similar to the last poured beverage. Typically, the control device 120 obtains or receives the stored information from memory 124 or other data storage device, and based at least in part on the stored information, can communicate with or control one or more of the sources 130, macro-ingredient sources 140, 150, supply lines 175, 185, and pumps 160 to facilitate pouring a subsequent beverage, similar to the last poured beverage, in a container, such as a cup.

In another example, a user may select a desired beverage Product C via the user interface 110, wherein the control device 120 can initiate pouring of the desired beverage in a container, such as a cup. The control device 120 can store information associated with a previously poured beverage in memory 124 or other data storage device. The stored information may include a predefined volume and recipe of one or more previously poured beverage including any recipe adjustments and user-entered data associated with adjusting the recipe. Based at least in part on the stored information, the control device 120 can provide a user selectable button or command, such as a previous pour button 308A, on the user interface 110 for the user to select the previously poured beverage. When the previous pour button 308A is selected by a user, the control device 120 can receive the command or corresponding signal from the user interface 110 and communicate with or control one or more of the sources 130, macro-ingredient sources 140, 150, supply lines 175, 185, and pumps 160 to facilitate pouring a subsequent beverage similar to the previously poured beverage. Typically, the control device 120 obtains or receives the stored information from memory 124 or other data storage device, and based at least in part on the stored information, can communicate with or control one or more of the sources 130, macro-ingredient sources 140, 150, supply lines 175, 185, and pumps 160 to facilitate pouring a subsequent beverage, similar to the previously poured beverage, in a container, such as a cup.

In any instance, the product dispenser 100 thus provides a user with the ability to pour or dispense a last poured or previously poured beverage for any number of or all of the beverages offered by the product dispenser 100 as desired. The user can select a last poured or previously poured button or command, which can obtain or otherwise retrieve stored information associated with a last poured or previously poured beverage. As such, the user can subsequently pour a beverage similar to the last poured or previously poured beverage with a single operation using the product dispenser 100.

Embodiments of the invention thus have applicability to conventional countertop devices, vending devices, and various types of bottling and filling devices. Although embodiments of the invention are described in terms of the product dispenser 100, embodiments of the invention are applicable to the combination of any types of ingredients, wet or dry. For example, commonly owned U.S. patent application Ser. No. 11/276,549, entitled "Juice Dispensing System," is specifically directed towards certain concepts related to the juice field. One may recognize the applicability of embodiments of the invention to the technology described in U.S. patent application Ser. No. 11/276,549.

Figure 3:
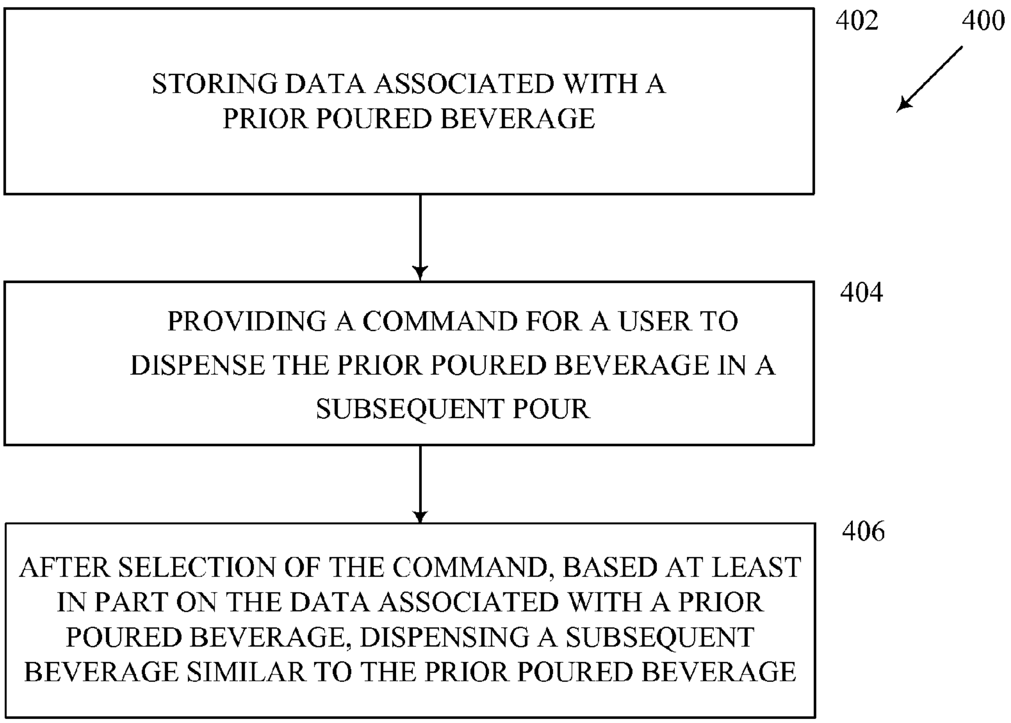
FIG. 3 is a schematic flowchart for a method of operating a product dispenser in accordance with an embodiment of the invention.

FIG. 3 is a process flowchart illustrating an example method in accordance with an embodiment of the invention. The example method 400 shown in FIG. 3 provides a method for operating a product dispenser. In particular, the method 400 is a method for operating a product dispenser with a plurality of beverage ingredient sources comprising a respective beverage ingredient, a plurality of beverage supply lines in respective communication with the plurality of ingredient sources, and at least one pump in communication with the plurality of beverage supply lines. The method 400 can be implemented by various system or product dispenser components shown in FIG. 1, such as 100 of FIG. 1.

The method 400 begins at block 402. In block 402, data associated with a prior poured beverage is stored. For example, in the embodiment shown with reference to FIGS. 1 and 2, a control device, such as 120, can receive a signal from a user interface, such as 110, 300, corresponding with a selected beverage offered by the product dispenser 100. The control device 120 can facilitate activation of one or more individual pumps 160 and/or the metering devices 170 for some or all corresponding ingredients and/or sources 130, 140, 150 to pour the selected beverage. The control device 120 can also store in memory, such as 124, or another data storage device information associated with the selected poured beverage. In one embodiment, a selected product can be about 12 fluid ounces of Product A. In any instance, the control device 120 can facilitate storing information associated with the prior poured beverage.

Block 402 is followed by block 404, in which a command is provided for a user to dispense the prior poured beverage in a subsequent pour. For example, in the embodiment shown with reference to FIGS. 1 and 2, the control device 120 can generate a last pour button, such as 306, or a previously poured button, such as 308A, or other command for an interface, such as 110, 300. The control device, such as 120, can display the button or command on the interface 110, 300 for selection by a user.

Block 404 is followed by block 406, in which after selection of the command, a subsequent beverage is dispensed similar to the prior poured beverage based at least in part on the data associated with a prior poured beverage. For example, in the embodiment shown with reference to FIGS. 1 and 2, the control device 120 can access the stored information in memory, such as 124, or another data storage device, and can facilitate activation of one or more individual pumps 160 and/or the metering devices 170 for some or all corresponding ingredients and/or sources 130, 140, 150 to pour a subsequent beverage similar to a last poured or previously poured beverage via a dispensing nozzle, such as 180.

In one aspect of an embodiment, the prior poured beverage can include a predefined volume and recipe, and the subsequent beverage can include the same predefined volume and recipe.

In one aspect of an embodiment, the method 400 can include providing a multiple pour command for a user to dispense the prior poured beverage in a plurality of subsequent pours; and after selection of the multiple pour command, based at least in part on the data associated with a prior poured beverage, dispensing a plurality of beverages similar to the prior poured beverage.

In one aspect of an embodiment, the method 400 can include providing a user interface operable to display the command and further operable to receive user selection of the command.

In one aspect of an embodiment, the method 400 can include providing an interface operable to receive user selection of the command.

The method 400 of FIG. 3 ends after block 406.

Figure 4:
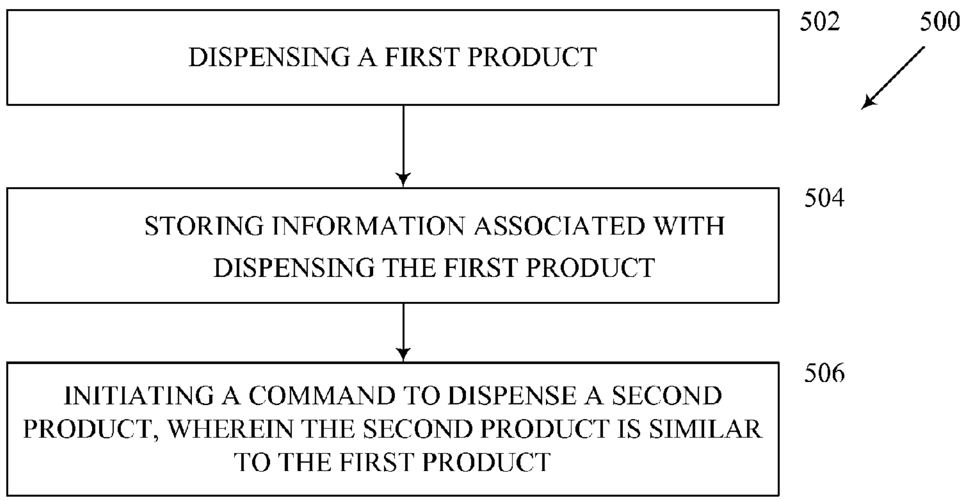
FIG. 4 is a schematic flowchart for a method for operating a product dispenser in accordance with an embodiment of the invention.

FIG. 4 is a process flowchart illustrating an example method in accordance with an embodiment of the invention. The example method 500 shown in FIG. 4 provides a method for operating a product dispenser. In particular, the method 500 is a method for operating a product dispenser with a plurality of beverage ingredient sources comprising a respective beverage ingredient, a plurality of beverage supply lines in respective communication with the plurality of ingredient sources, and at least one pump in communication with the plurality of beverage supply lines. The method 500 can be implemented by various system or product dispenser components shown in FIG. 1, such as 100 of FIG. 1.

The method 500 begins at block 502. In block 502, a first product is dispensed. For example, in the embodiment shown with reference to FIGS. 1 and 2, a control device, such as 120, can receive a signal from a user interface, such as 110, 300, corresponding with a selected beverage offered by the product dispenser 100. The control device 120 can facilitate activation of one or more individual pumps 160 and/or the metering devices 170 for some or all corresponding ingredients and/or sources 130, 140, 150 to dispense the selected product.

Block 502 is followed by block 504, in which information associated with dispensing the first product is stored. For example, in the embodiment shown with reference to FIGS. 1 and 2, the control device can store in memory, such as 124, or another data storage device information associated with the selected dispensed product. In one embodiment, a selected dispensed product can be about 12 fluid ounces of Product A.

Block 504 is followed by block 506, in which a command is initiated to dispense a second product, wherein the second product is similar to the first product. For example, in the embodiment shown with reference to FIGS. 1 and 2, the control device 120 can access the stored information in memory, such as 124, or another data storage device, and can facilitate activation of one or more individual pumps 160 and/or the metering devices 170 for some or all corresponding ingredients and/or sources 130, 140, 150 to dispense a subsequent product similar to the first dispensed product, such as via a dispensing nozzle 180.

In one aspect of an embodiment, the method 500 can include initiating a command to dispense a plurality of products, wherein the plurality of products are similar to the first product.

In one aspect of an embodiment, the first product can include a predefined volume and recipe, and the second product can include the same predefined volume and recipe.

The method 500 of FIG. 4 ends after block 506.

The example elements of FIGS. 3 and 4 are shown by way of example, and other process embodiments can have fewer or greater numbers of elements, and such elements can be arranged in alternative configurations in accordance with other embodiments of the invention. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer such as a switch, or other programmable data processing apparatus to produce a machine, such that the instructions which execute on the computer or other programmable data processing apparatus create means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including instruction means that implement the function specified in the flowchart block or blocks. The computer program instructions may also be loaded onto a computer or other programmable data processing apparatus to cause a series of operational elements or steps to be performed on the computer or other programmable apparatus to produce a computer implemented process such that the instructions that execute on the computer or other programmable apparatus provide elements for implementing the functions specified in the flowchart block or blocks.

Accordingly, blocks of the block diagrams and flowchart illustrations support combinations of means for performing the specified functions, combinations of elements or steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions, elements, or combinations of special purpose hardware and computer instructions.

The capabilities of various embodiments of the invention can be implemented in software, firmware, hardware or some combination thereof.

As one example, one or more aspects of the invention can be included in an article of manufacture (e.g., one or more computer program products) having, for instance, computer usable media. The media has embodied therein, for instance, computer readable program code means for providing and facilitating the capabilities of the embodiment of the invention. The article of manufacture can be included as a part of a computer system or sold separately.

Additionally, at least one program storage device readable by a machine, tangibly embodying at least one program or set of instructions executable by the machine to perform the capabilities of the embodiment of the invention can be provided.

The flow diagrams depicted herein are examples. There may be many variations to these diagrams or the elements (or operations) described therein without departing from the scope of the claimed invention. For instance, the elements may be performed in a differing order, or elements may be added, deleted or modified. All of these variations are considered a part of the claimed inventions.

While embodiments of the invention have been described, it will be understood that those skilled in the art, both now and in the future, may make various improvements and enhancements which fall within the scope of the claims which follow. These claims should be construed to maintain the proper protection for the invention first described.

The claimed invention is:

1. A product dispenser, comprising:

a plurality of beverage ingredient sources comprising a respective beverage ingredient;

a plurality of beverage supply lines in respective communication with the plurality of beverage ingredient sources;

at least one pump in communication with the plurality of beverage supply lines;

a controller in communication with the at least one pump and operable to execute a set of instructions operable to:

store data associated with a prior poured beverage;

provide a command for a user to dispense the prior poured beverage in a subsequent pour, wherein the command comprises at least one of the following: (i) a beverage selection option for more than one prior poured beverage, (ii) a series of touch screen display buttons for more than one prior poured beverage, (iii) a beverage selection option for dispensing the prior poured beverage using stored volume and recipe information associated with the prior poured beverage, (iv) a product button adjacent to a respective indicator displayed to indicate the product button is associated with the prior poured beverage, or (v) a command to dispense the prior poured beverage multiple times; and after selection of the command, based at least in part on the data associated with the prior poured beverage, dispense a subsequent beverage similar to the prior poured beverage.

2. The product dispenser of claim 1, wherein the prior poured beverage comprises a predefined volume and recipe, and the subsequent beverage comprises the same predefined volume and recipe.

3. The product dispenser of claim 1, the controller further operable to:

store data associated with a plurality of prior poured beverages.

4. The product dispenser of claim 1, the controller further operable to:

provide a multiple pour command for a user to dispense the prior poured beverage in a plurality of subsequent pours; and after selection of the multiple pour command, based at least in part on the data associated with the prior poured beverage, dispense a plurality of beverages similar to the prior poured beverage.

5. The product dispenser of claim 1, further comprising:

a user interface in communication with the controller, the user interface operable to display the command and further operable to receive user selection of the command.

6. The product dispenser of claim 1, further comprising:

an interface in communication with the controller, the interface operable to receive user selection of the command.

7. A computer program product, comprising a computer readable medium having computer readable program code, the computer readable program code operable to be executed to implement a method for operating a product dispenser, the method comprising:

storing data associated with a prior poured beverage;

providing a command for a user to dispense the prior poured beverage in a subsequent pour, wherein the command comprises at least one of the following: (i) a beverage selection option for more than one prior poured beverage, (ii) a series of touch screen display buttons for more than one prior poured beverage, (iii) a beverage selection option for dispensing the prior poured beverage using stored volume and recipe information associated with the prior poured beverage, (iv) a product button adjacent to a respective indicator displayed to indicate the product button is associated with the prior poured beverage, and (v) a command to dispense the prior poured beverage multiple times; and after selection of the command, based at least in part on the data associated with the prior poured beverage, dispensing a subsequent beverage similar to the prior poured beverage.

8. The computer program product of claim 7, wherein the prior poured beverage is a last poured beverage.

9. The computer program product of claim 7, wherein the prior poured beverage comprises a predefined volume and recipe, and the subsequent beverage comprises the same predefined volume and recipe.

10. The computer program product of claim 7, the method further comprising:

providing a multiple pour command for a user to dispense the prior poured beverage in a plurality of subsequent pours; and after selection of the multiple pour command, based at least in part on the data associated with the prior poured beverage, dispensing a plurality of beverages similar to the prior poured beverage.

11. The computer program product of claim 7, the method further comprising:

displaying, via a user interface in communication with a controller, the command for selection by the user.

12. The computer program product of claim 7, the method further comprising:

facilitating an interface in communication with the controller, the interface operable to receive user selection of the command.

13. A method for operating a product dispenser, the method comprising:

storing data associated with a prior poured beverage;

providing a command for a user to dispense the prior poured beverage in a subsequent pour, wherein the command comprises at least one of the following: (i) a beverage selection option for more than one prior poured beverage, (ii) a series of touch screen display buttons for more than one prior poured beverage, (iii) a beverage selection option for dispensing the prior poured beverage using stored volume and recipe information associated with the prior poured beverage, (iv) a product button adjacent to a respective indicator displayed to indicate the product button is associated with the prior poured beverage, and (v) a command to dispense the prior poured beverage multiple times; and after selection of the command, based at least in part on the data associated with the prior poured beverage, dispensing a subsequent beverage similar to the prior poured beverage.

14. The method of claim 13, wherein the prior poured beverage comprises a predefined volume and recipe, and the subsequent beverage comprises the same predefined volume and recipe.

15. The method of claim 13, further comprising:

providing a multiple pour command for a user to dispense the prior poured beverage in a plurality of subsequent pours; and after selection of the multiple pour command, based at least in part on the data associated with the prior poured beverage, dispensing a plurality of beverages similar to the prior poured beverage.

16. The method of claim 13, further comprising:

providing a user interface operable to display the command and further operable to receive user selection of the command.

17. The method of claim 13, further comprising:

providing an interface operable to receive user selection of the command.

18. A method for operating a product dispenser, the method comprising:

dispensing a first product;

storing information associated with dispensing the first product; and initiating a command to dispense a second product, wherein the second product is similar to the first product, and wherein the command comprises at least one of the following: (i) a beverage selection option for more than one prior poured beverage, (ii) a series of touch screen display buttons for more than one prior poured beverage, (iii) a beverage selection option for dispensing the prior poured beverage using stored volume and recipe information associated with the prior poured beverage, (iv) a product button adjacent to a respective indicator displayed to indicate the product button is associated with the prior poured beverage, and (v) a command to dispense the prior poured beverage multiple times.

19. The method of claim 18, further comprising:

initiating a command to dispense a plurality of products, wherein the plurality of products are similar to the first product.

20. The method of claim 18, wherein the first product comprises a predefined volume and recipe, and the second product comprises the same predefined volume and recipe.

* * * * *